(12) United States Patent
Fukutome et al.

(10) Patent No.: US 11,166,444 B2
(45) Date of Patent: Nov. 9, 2021

(54) MOVABLE CENTER-OF-GRAVITY TUBE AND FISHING LURE HAVING SAME BUILT IN

(71) Applicants: HEPHAIST SEIKO CO., LTD., Kawagoe (JP); MEGABASS, INC., Hamamatsu (JP)

(72) Inventors: Hiroto Fukutome, Kawagoe (JP); Koichi Ito, Hamamatsu (JP)

(73) Assignee: HEPHAIST SEIKO CO., LTD., Shizuoka (JP)

( * ) Notice: Subject to any disclaimer, the term of this patent is extended or adjusted under 35 U.S.C. 154(b) by 283 days.

(21) Appl. No.: 16/470,154

(22) PCT Filed: Dec. 7, 2017

(86) PCT No.: PCT/JP2017/044004
§ 371 (c)(1),
(2) Date: Jun. 14, 2019

(87) PCT Pub. No.: WO2018/110424
PCT Pub. Date: Jun. 21, 2018

(65) Prior Publication Data
US 2020/0015465 A1 Jan. 16, 2020

(30) Foreign Application Priority Data

Dec. 16, 2016 (JP) .............................. JP2016-244610

(51) Int. Cl.
*A01K 85/18* (2006.01)
*F16C 29/06* (2006.01)

(52) U.S. Cl.
CPC .............. *A01K 85/18* (2013.01); *F16C 29/06* (2013.01)

(58) Field of Classification Search
CPC .......... A01K 85/00; A01K 85/18; F16C 29/06
(Continued)

(56) References Cited

U.S. PATENT DOCUMENTS 1,394,313 A * 10/1921 Leeper ................... A01K 85/16
  43/42.23
2,100,372 A * 11/1937 Barton ................... A63H 15/02
  446/167

(Continued)

FOREIGN PATENT DOCUMENTS

FR    2334111 A1 * 7/1977 ............. B60Q 1/447
JP    2005-226761 A    8/2005
(Continued)

OTHER PUBLICATIONS

International Search Report for International Application No. PCT/JP2017/044004, dated Mar. 13, 2018.

*Primary Examiner* — Christopher P Ellis
(74) *Attorney, Agent, or Firm* — Nixon Peabody LLP; Jeffrey L. Costellia

(57) ABSTRACT

A movable center-of-gravity tube comprising a tube body (41), a center-of-gravity body (42) accommodated inside the tube body and balls (43) held on the center-of-gravity body (42) is provided, in which the center-of-gravity body (42) has a slightly smaller diameter than the diameter of an inner surface of the tube body and comprises three or more rows of ball circulation grooves (44) on its outer surface in parallel with each other, in which the ball circulation grooves (44) accommodate the balls in a circulation manner, and each of which comprises two rows connected to each other, in such manner that the balls in one groove of the ball circulation grooves rotate and circulate in contact with the inner circumferential surface of the tube body, while the balls in another groove rotate and circulate in no contact with the inner circumferential surface of the tube body, when the center-of-gravity body moves.

4 Claims, 4 Drawing Sheets

(58) Field of Classification Search
USPC .......................................................... 43/42.31
See application file for complete search history.

(56) References Cited

U.S. PATENT DOCUMENTS

| | | | | |
|---|---|---|---|---|
| 2,488,678 A * | 11/1949 | Nardi | ...................... | A01K 85/16 43/42.06 |
| 2,718,725 A * | 9/1955 | Thurman | ............... | A01K 85/01 43/42.31 |
| 2,878,611 A * | 3/1959 | Netherton | .............. | A01K 85/01 43/42.06 |
| 3,044,207 A * | 7/1962 | Dorsett | .................. | A01K 85/16 43/42.31 |
| 3,047,972 A * | 8/1962 | Taylor | .................... | A01M 31/06 43/3 |
| 3,863,380 A * | 2/1975 | Purlia | .................... | A01K 85/01 43/17.6 |
| 4,095,658 A * | 6/1978 | Kendall | ............ | A61M 5/16845 177/118 |
| 4,155,191 A * | 5/1979 | Spivey | ................... | A01K 85/16 43/42.22 |
| 4,630,389 A * | 12/1986 | Higgins | ................ | A01K 85/01 43/42.22 |
| 4,747,228 A * | 5/1988 | Giovengo, Jr. | ........ | A01K 85/01 43/42.31 |
| 4,761,910 A * | 8/1988 | Ninomiya | .............. | A01K 85/16 43/42.22 |
| 4,920,686 A * | 5/1990 | McGahee | ............... | A01K 85/01 43/42.1 |
| 5,134,799 A * | 8/1992 | Trnka | ..................... | A01K 85/16 43/42.22 |
| 5,329,721 A * | 7/1994 | Smith | ..................... | A01K 85/16 43/42.22 |
| 5,561,938 A * | 10/1996 | Kato | ...................... | A01K 85/16 43/42.22 |
| 5,566,498 A * | 10/1996 | Itoh | ......................... | A01K 85/16 43/42.31 |
| 5,926,995 A * | 7/1999 | Dubois | .................. | A01K 85/01 43/42.31 |
| 5,992,084 A * | 11/1999 | Kitagawa | ............... | A01K 85/16 43/42.22 |
| 6,671,996 B1 * | 1/2004 | Ito | .......................... | A01K 85/16 43/42.31 |
| 2003/0093939 A1 * | 5/2003 | Salonen | ................. | A01K 85/16 43/42.22 |
| 2003/0110678 A1 * | 6/2003 | Yong-Set | ............... | A01K 85/16 43/42.22 |
| 2010/0000145 A1 * | 1/2010 | Leppala | ................. | A01K 85/01 43/42.31 |
| 2012/0324778 A1 * | 12/2012 | Choi | ...................... | A01K 85/00 43/42.22 |
| 2018/0249692 A1 * | 9/2018 | Choi | ...................... | A01K 85/00 |
| 2019/0208756 A1 * | 7/2019 | Ichiyanagi | ............. | A01K 93/00 |

FOREIGN PATENT DOCUMENTS

| | | | |
|---|---|---|---|
| JP | 2016-82907 A | 5/2016 | |
| JP | 2016-145625 A | 8/2016 | |
| WO | WO-9902787 A1 * | 1/1999 | ............... E02D 7/06 |
| WO | WO-2018110424 A1 * | 6/2018 | ............. A01K 85/18 |

* cited by examiner

MOVABLE CENTER-OF-GRAVITY TUBE AND FISHING LURE HAVING SAME BUILT IN

FIELD OF THE INVENTION

The present invention relates to a movable center-of-gravity tube which varies its center-of-gravity position in accordance with slanting condition of the same, and a fishing lure having the same in its body.

BACKGROUND OF THE INVENTION

In fishing sports are generally employed a lure having appearance analogous to a small fish for serving as a bait. In the known cast fishing, the lure connected to a fishing line is cast in a distant sea area from shore or wharf. In the cast fishing, the lure should be cast as distant as possible. Therefore, a lure generally comprises a weight therein. In addition, the lure is prepared to take in the sea such a position inclining its head downward and to smoothly move in the sea or on the sea surface in accordance with the fisher's operation, in such manner that a fish takes in the sea or on sea surface.

In patent publication 1, there is disclosed a fishing lure comprising a hollow body and a lip provided to its head for inclining slightly downward around its front end which is to be connected to a fishing line. The lip is to work like a head of a small fish. In the hollow body, a weight is provisionally fixed to a magnet placed on the front side. The weight can move forward and backward freely after the lure is cast and the weight is displaced from the magnet.

The configuration of the lure disclosed in the publication 1 is described in more detail, referring to claim 1 given in the publication 1.

The lure has a hollow body which has an appearance analogous to a small fish and a lip so formed in a front area as to appropriately incline forward. Within the hollow lure body is provided a guide shaft extended from the front end to the rear end, a linear bush sliding along the guide shaft, and a magnet arranged on the front side for provisionally fixing the linear bush thereto.

In the drawings attached to the present specification, the figures given in the patent publication 1 are selected and placed as FIGS. 1 to 3. The constitution and function of the lure is described below, referring to the attached FIGS. 1 to 3.

FIG. 1 is a front view of the lure disclosed in the patent publication 1 to show a division of its whole constitution. In the figure, the lure 10 has a lure body 11 having an appearance analogous to a small fish. The lure body is generally produced by molding synthetic resin material. The front end of the lure body 11 is provided with a ring 12 to which a line (i.e., fishing line) is connected. Along the lure body, there are provided a hook hangers 14, 15, 16, sequentially, from the front end to the rear end. To these hook hangers are connected respectively a front hook (front fishing hook) 18, a middle hook (middle fishing hood) 19 and a rear hook (rear fishing hook) 20. Below the front side, a lip in the form of a thin plate (diving plate) 21 is provided to take a position inclining slightly downward. When the lure 10 is cast on the sea and then the fisher draws the line 13, the lure body 11 moves and takes such a position inclining forward as to dive in the sea.

In the next, the inner constitution of the lure body 11 is described. The lure body 11 has a long and narrow hollow space inside. Inside the hollow space is provided a guide shaft 22 in the longitudinal direction. Along the guide shaft 22, a linear bush 23 is provided so as to freely move forward and backward. The guide shaft 22 is fixed to the lure body 11 by way of ribs 24, 25 within its hollow inner space.

The linear bush 23 comprises a bush body 26 and a pair of weights 27 connected to thereto 26 on both ends. Since the linear bush 23 has such constitution, the linear bush 23 per se works as a movable center-of-gravity.

On the inner circumferential surface of the linear bush body 26 are placed balls (spherical bodies) 28, and the balls rotate and circulate along the guide shaft 22. Since the linear bush 26 has this constitution, the linear bush 26 smoothly slides on the guide shaft 22 forward and backward in accordance with the inclining position of the lure body 11.

To the front rib in the inner hollow space is attached a magnet 29, and the linear bush 23 is provisionally placed in contact with the magnet 29.

The linear bush is generally known as a linear motion bearing, and the linear bush corresponds to one of conventional linear motion bearings. In more detail, the linear bush 30 comprises a outer cylinder 31, a retainer placed in the outer cylinder (that is, a ball-holding member having grooves for keeping balls under circulating condition) 32, and plural balls 28 kept within the grooves of the retainer. The outer cylinder 30 has on its ends stop rings 33 for keeping the balls 28 within the outer cylinder.

The balls 28 kept in the grooves of the retainer 32 rotate and circulate within the grooves in accordance with the movement of linear bush 23 along the guide shaft 22. Accordingly, the linear bush 23 slides and moves in the variably inclining direction of the guide shaft 22 (which inclines along the variable inclination of the lure 10).

The lure for fishing disclosed in the patent publication 1 has the above-mentioned constitution and is favorably employed in the fishing. Accordingly, the lure of the patent publication 1 appears enough for the fishers. However, there are such problems that the lure has a complex inner constitution and that the lure is not easily manufactured. Therefore, its manufacturing cost cannot be easily lowered, and therefore the disclosed lure is not broadly accepted by fishers.

In patent publication 2 is disclosed a body sliding in a tube. The sliding body is placed inside of a tublar vessel. The disclosed sliding body comprises a cylindrical ball-holding means having at least three ball-circulating grooves provided with slits on both of inner circumferential side and outer circumferential side for partly exposing plural balls, each of the ball circulating grooves composing of a ball rotating-moving groove having an opening in the form of a slit and a ball returning groove connected to both ends of the ball rotating-moving groove; plural balls placed within the ball circulating grooves; and a shaft fixed in the tublar vessel. The sliding body slides along the shaft within the tublar vessel with rotations and movements of the balls which kept in contact with the inner circumferential surface of the pipe vessel and the outer circumferential surface of the shaft.

Therefore, the center-of-gravity moves in the sliding body disclosed in the patent publication 2 equally or more smoothly than in the sliding body of the patent publication 1.

However, it is still problematic that the lure has a complex inner constitution and that the lure is not easily manufactured. Therefore, its manufacturing cost cannot be easily lowered.

By the way, it is noted that the patent publication 2 further discloses that the disclosed in-pipe sliding body can be employed not only as a movable center-of-gravity body for fishing lures but also employed for manufacturing magnetic generators and sliding units.

PATENT PUBLICATION DISCLOSING PRIOR ART

Patent publication 1: Japanese laid-open patent publication 2016-92907
Patent publication 2: Japanese laid-open patent publication 2016-145626

SUMMARY OF THE INVENTION

The center-of-gravity moving mechanisms described in the patent publications 1 and 2 work well in the use of fishing lures. However, as is described above, both have such problems that their constitutions are complicated and their manufactures are not easy. Then, their manufacturing costs cannot be easily reduced.

Accordingly, the problems to be solved by the invention are to provide a movable center-of-gravity tube that enables smooth movement of the center-of-gravity in the manner that can be accomplished by those disclosed in the patent publications 1 & 2, while its constitution is more simple and its manufacturing cost is lower, and therefore, is favorably employable as a movable center-of-gravity tube to be favorably included into low-cost fishing lures.

The present inventors have studied the above-mentioned problems and found that the below-described movable-center-of-gravity tube can solve these problems:

A movable center-of-gravity tube comprising a tube body, a center-of-gravity body accommodated inside the tube body, and balls held on the center-of-gravity body, in which the center-of-gravity body has a slightly smaller diameter than the diameter of an inner surface of the tube body and comprises three or more rows of ball circulation grooves on its outer surface in parallel with each other, in which the ball circulation grooves accommodate the balls in a circulation manner, and each of which comprises two rows connected to each other, in such manner that the balls in one groove of the ball circulation grooves rotate and circulate in contact with the inner circumferential surface of the tube body, while the balls in another groove rotate and circulate in no contact with the inner circumferential surface of the tube body, when the center-of-gravity body moves.

The above-mentioned movable center-of-gravity tube is favorably utilizable as the movable center-of-gravity tube to be included in a fishing lure having appearance analogous to a small fish and a hollow lure body which is provided with a forwardly slanting lip on one end, in which the hollow lure body contains therein a movable center-of-gravity tube.

Preferred embodiments of the movable center-of-gravity tube of the invention are described below.
 (1) The center-of-gravity body is made of metal material.
 (2) The tube body is provided with a magnet at least at one end.
 (3) Three ball circulation grooves are provided.

Effects of the Invention

The movable center-of-gravity tube provided by the invention enables smooth movement of the center-of-gravity in the manner that can be accomplished by those disclosed in the patent publications 1 & 2, while its constitution is more simple and its manufacturing cost is lower.

EMBODIMENT OF THE INVENTION

The movable center-of-gravity tube and fishing lure according to the invention are described below, referring to FIGS. 4 to 7. It should be noted that the constitution of the prior art fishing lure is described in the descriptions given herein-before, referring to FIGS. 1 to 3.

Figure 4:
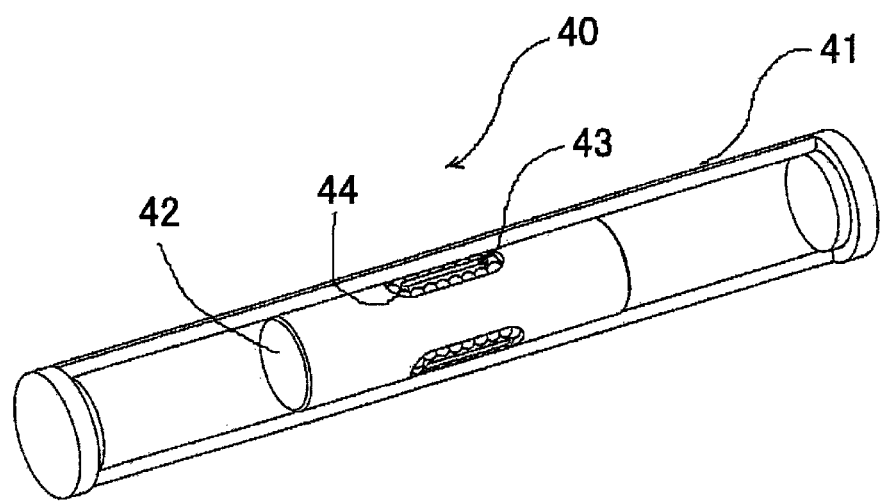
FIG. 4 is a schematic view of a movable center-of gravity tube according to the invention.
Figure 5:
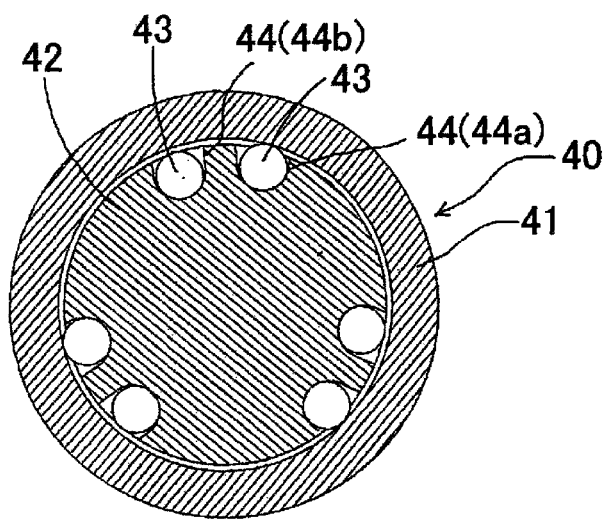
FIG. 5 shows a section of the movable center-of-gravity tube shown in FIG. 4.

FIG. 4 is a schematic view showing an example of the constitution of movable center-of-gravity tube according to the invention. FIG. 5 shows a section along the diameter.

In FIG. 4 and FIG. 5, the movable center-of-gravity tube 40 comprises a tube body 41, a center-of-gravity body 42 which is included within the tube body in such manner that the center-of-gravity body is movable in the tube body, and balls 43 held on the center-of-gravity body.

The center-of-gravity body 42 has a slightly smaller diameter than the diameter of an inner surface of the tube body 41 and comprises three or more rows of ball circulation grooves 44 on its outer surface in parallel with each other, in which each ball circulation groove comprises two grooves connected to each other. The ball circulation grooves contain balls 43 in a circulation manner.

The balls contained in one groove of the ball circulation grooves rotate and circulate in contact with the inner circumferential surface of the tube body when the center-of-gravity body moves, while the balls contained in another groove rotate and circulate in no contact with the inner circumferential surface of the tube body.

In the invention, it is preferred that there ball circulation grooves are provided, in consideration of the manufacturing and smooth moving of the movable center-of-gravity body.

The tube body of the movable center-of-gravity body can be made of metal material, resin material, or ceramic material such as glass. The tube body can be preferably made of metal material such as stainless steel. However, the tube body may be made of a composite of metal material and resin material.

The movement of the center-of-gravity body in the movable center-of-gravity tube of the invention is done in a manner similar to the movement of a retainer (ball-holding means) encased in an outer cylinder of a linear bush (which is generally used as a linear motion bearing). In more detail, the ball-holding/circulating means of the retainer encased in the outer cylinder of a linear bush consists of two rows of grooves and so holds the balls as to enable their eternal circulation.

In the circulation, the balls within one groove of the ball circulation grooves rotate and circulate in contact with the inner circumferential surface of the tube body, while the balls within another groove rotate and circulate in no contact with the inner circumferential surface of the tube body.

Figure 6:
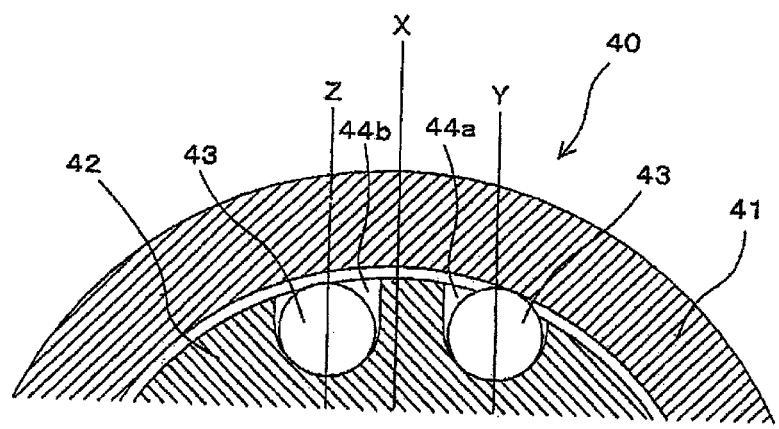
FIG. 6 is a partially enlarged view of the section of the movable center-of-gravity tube shown in FIG. 4.

For the sake of convenience, the constitution of the movable center-of-gravity tube to enable smooth movement of the center-of-gravity body in the movable center-of-gravity tube according to the invention is described below, referring to FIG. 5 and FIG. 6.

The ball-circulating groove 44 formed on the center-of-gravity body 40 consists of a ball rotation movement groove 44a within which the balls 43 move under rotation in contact with the internal surface of the tube 41, and a ball return groove 44b within which the balls 43 move under rotation in no contact with the internal surface of the tube 41. The ball rotation movement groove 44a and the ball return groove 44b are so connected to each other at both ends, as to the balls circulate in these grooves.

The relationship of the position of the ball rotation movement groove 44a and the position of the ball return groove 44b are described below in more detail. The line X indicating the position of the center of the center-of-gravity body. The distance of the line Y indicating the position of the ball rotation movement groove 44a from the line X is adjusted to differ from the distance of the line Z indicating the position of the ball return groove 44b from the line X, in such manner that the former distance (namely, X-Y) is adjusted to be larger than the latter distance (namely, X-Z).

Since the distance (X-Y) of the line Y indicating the position of the ball rotation movement groove 44a from the line X is made to be relatively large, balls residing in the ball rotation movement groove 44a are kept in contact with the internal surface of the tube body 41, while balls residing in the ball return groove 44b are kept in no contact with the internal surface of the tube body 41. Therefore, balls 43 can smoothly circulate within the ball circulating groove 44 thorough the ball rotation movement groove 44a and the ball return groove 44b.

The fishing lure of the invention, which includes the aforementioned movable center-of-gravity tube in its body is described below, referring to FIG. 7.

Figure 1:
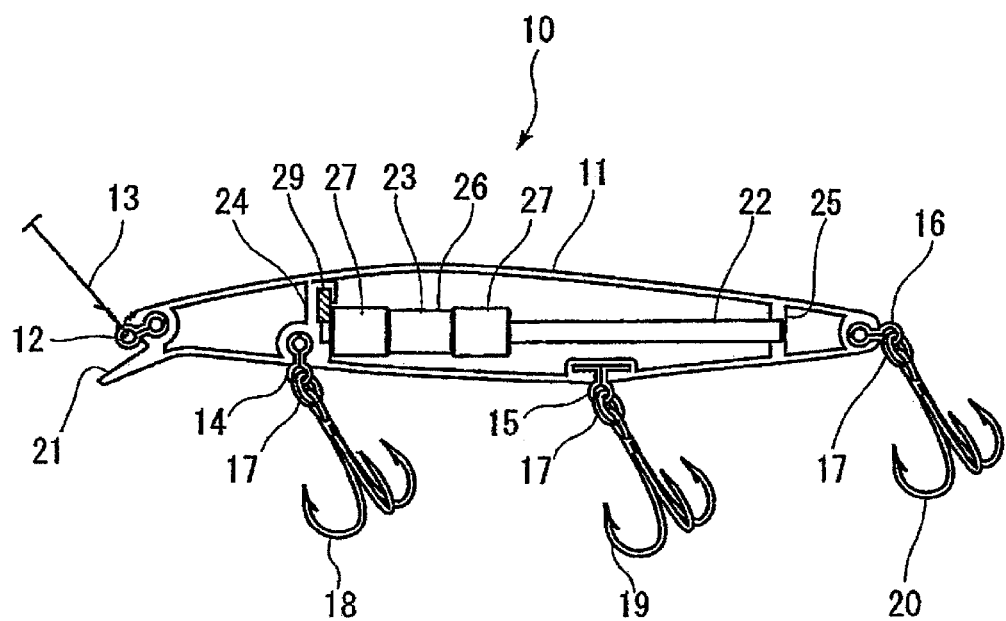
FIG. 1 shows a section of a whole figure of the fishing lure disclosed in publication 1.
Figure 7:
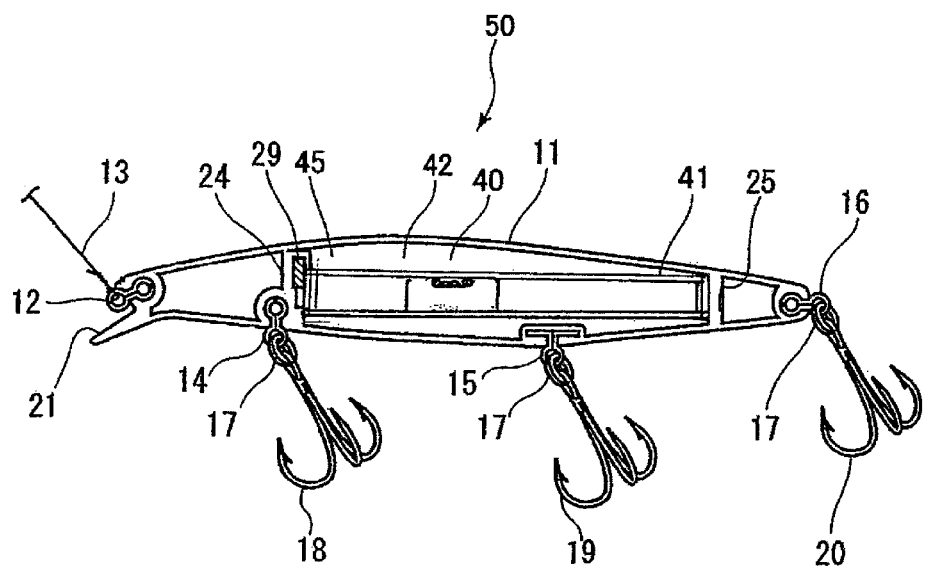
FIG. 7 is a partial section of a typical fishing lure in which the movable center-of-gravity tube shown in FIG. 4 is included.

The fishing lure 50 shown in FIG. 7 has essentially the same structure as the fishing lure disclosed in the patent publication 1 (namely, the fishing lure described hereinbefore, referring to FIG. 1). In more detail the fishing lure 50 comprises a lure body 11 and the movable center-of-gravity tube 40 of the invention. Descriptions concerning other constitutional members (12, 13, 14, 15, 16, 17, 18, 19, 20, 21) are no more required.

As is easily understandable, the fishing lure of FIG. 7 has such constitution as that of the fishing lure of FIG. 1 replaced with the fishing lure which works according to the mechanism of the center-of-gravity movement proposed by the invention.

The magnet 29 attached to the lib 24 of the lure body 11 in FIG. 1 can be employed as such in the invention. Otherwise, the magnet 29 can be attached to one end of the movable center-of-gravity tube 40.

Figure 2:
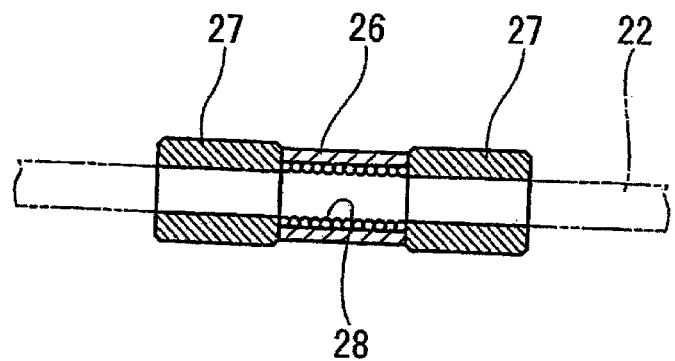
FIG. 2 shows the center-of-gravity movement mechanism of a linear bush included in the fishing lure.
Figure 3:
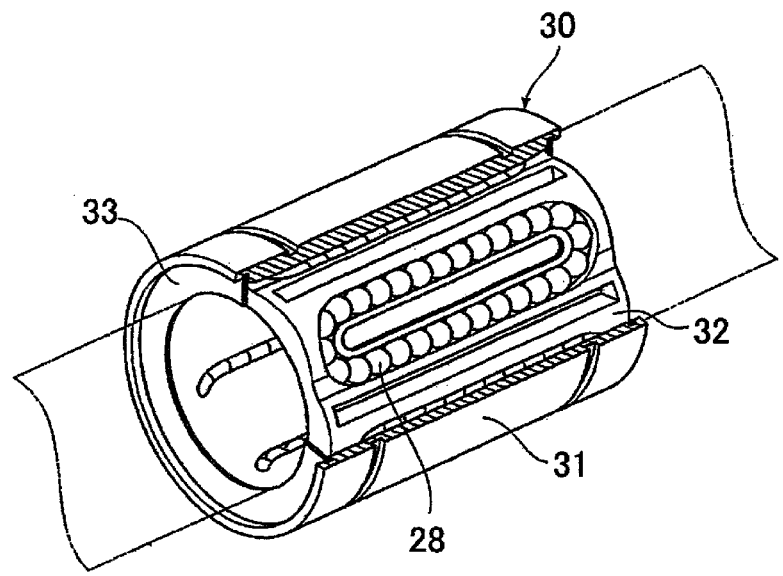
FIG. 3 is a schematic view of the linear bush shown in FIG. 2.

As is apparent from FIG. 7, the fishing lure containing the movable center-of-gravity tube therein has a more simple structure, compared with the fishing lure 11 illustrated in FIG. 1 to FIG. 3. Therefore, the manufacturing of the fishing lure of the invention, particularly, incorporation of the movable center-of-gravity tube into the fishing lure, can be more easily done.

As is understandable from the descriptions given hereinbefore, the fishing lure of the invention has a structure essentially the same as that disclosed in the patent publication 1 and can be employable for the same purpose. Accordingly, most of the descriptions of fishing lures given in the patent publication 1 are appropriate for the fishing lure of the invention, and these descriptions are contained in the descriptions for the fishing lure of the invention.

In addition, the movable center-of-gravity tube of the invention can be employed not only for the fishing lures but also for magnetic generators and sliding units. The uses of the movable center-of-gravity tube in the fields other than the fishing lure are described in detail in the patent publication 2. Therefore, these descriptions are also contained in the descriptions for the uses of the movable center-of-gravity tube of the invention.

DESCRIPTION OF SYMBOLS 10 fishing lure described in the patent publication 1; 11 lure body described in the patent publication 1; 13 fishing line; 22 guide shaft; 23 linear bush; 40 movable center-of-gravity tube of the invention; 41 tube body; 42 center-of-gravity body; 43 spherical body (ball); 44 ball circulation groove; 50 fishing lure

What is claimed is:

1. A movable center-of-gravity tube configured for use with a fishing lure comprising a tube body, a cylindrical center of gravity body accommodated inside the tube body, and balls held on the cylindrical center of gravity body, in which the cylindrical center of gravity body has a slightly smaller diameter than the diameter of an inner surface of the tube body and comprises three or more endless circulation grooves, each comprising a ball movement groove and a ball return groove on its outer surface in parallel with each other, in which the endless circulation grooves accommodate the balls in a circulation manner, and each of which has a closed bottom and comprises two rows connected to each other, in such manner that the balls in the movement groove rotate and circulate in contact with said inner surface of the tube body and, balls in the return groove circulate out of contact, when the cylindrical center of gravity body moves.

2. The movable center-of-gravity tube described in claim 1, in which the tube body is provided with a magnet at least at one end.

3. The movable center-of-gravity tube described in claim 1, in which three ball circulation grooves are provided.

4. A fishing lure having appearance analogous to a small fish and a hollow lure body which is provided with a forwardly slanting lip on one end, in which the hollow lure body contains therein a movable center-of-gravity tube comprising a tube body, a cylindrical center of gravity body accommodated inside the tube body, and balls held on the cylindrical center of gravity body is provided, in which the cylindrical center of gravity body has a slightly smaller diameter than the diameter of an inner surface of the tube body and comprises three or more endless circulation grooves, each comprising a ball movement groove and a ball return groove on its outer surface in parallel with each other, in which the endless circulation grooves accommodate the balls in a circulation manner, and each of which has a closed bottom and comprises two rows connected to each other, in such manner that the balls in the movement groove rotate and circulate in contact with said inner surface of the tube body and balls in the return groove circulate out of contact, when the cylindrical center of gravity body moves.

* * * * *